United States Patent [19]
Bechtel et al.

[11] Patent Number: 5,998,047
[45] Date of Patent: Dec. 7, 1999

[54] ALUMINATE PHOSPHOR WITH A POLYPHOSPHATE COATING

[75] Inventors: Helmut Bechtel, Roetgen; Wolfram Czarnojan, Aachen; Walter Mayr, Würselen; Thomas Jüstel, Aachen; Hans Nikol, Aachen; Cornelis Rhonda, Aachen, all of Germany

[73] Assignee: U.S. Philips Corporation, New York, N.Y.

[21] Appl. No.: 09/104,486

[22] Filed: Jun. 25, 1998

[30] Foreign Application Priority Data

Jun. 28, 1997 [DE] Germany ............ 197 27 607

[51] Int. Cl.$^6$ .................................. H01J 29/10
[52] U.S. Cl. ................ 428/690; 428/403; 313/484; 313/485; 313/486; 313/487; 313/584; 313/585; 313/586; 313/587; 252/301.4 R; 252/301.6 P
[58] Field of Search ............... 313/584, 585, 313/586, 587, 484, 485, 487, 486, 582; 428/690, 403, 407; 252/301.4 R, 301.6 P

[56] References Cited

U.S. PATENT DOCUMENTS

| | | | |
|---|---|---|---|
| 3,573,531 | 4/1971 | Kerstetter et al. | 313/485 |
| 4,258,285 | 3/1981 | Chenot et al. | 313/487 |
| 5,518,808 | 5/1996 | Bruno et al. | 428/323 |
| 5,739,632 | 4/1998 | Haase et al. | 313/467 |
| 5,838,106 | 11/1998 | Funada | 313/587 |

OTHER PUBLICATIONS

"Advanced Inorganic Chemistry" 5th Edition by F.A. Cotton & G. Wilkinson, John Wiley & Sons, New York, pp. 421–429, 1988.

*Primary Examiner*—Charles Nold
*Attorney, Agent, or Firm*—John C. Fox

[57] ABSTRACT

A plasma display device with a phosphor screen, comprising a phosphor composition of an UV-phosphor furnished with a coating which includes one or more catena-polyphosphates of metals of the group formed by the alkaline earth metals, zinc, cadmium and manganese, can effectively be used to counteract degradation of the phosphor by UV-excitation.

8 Claims, 2 Drawing Sheets

ALUMINATE PHOSPHOR WITH A POLYPHOSPHATE COATING

BACKGROUND OF THE INVENTION

The invention relates to a plasma display device with a phosphor screen, comprising a phosphor composition of an UV-phosphor with a coating.

A plasma device comprises, in principle, two glass plates which are connected to one another by spacers 5 and which form a hermetically sealed interspace. Said interspace is filled with a noble gas or a noble gas mixture. The intermediate space comprises anodes and cathodes 3 in a dielectric layer which are arranged at right angles to each other so as to form a lattice. A plasma discharge is ignited between the crossing points of the anodes and cathodes. The UV radiation generated in the plasma discharge is converted by a phosphor layer 6 into red, green or blue light. This process is similar to that in fluorescent tubes, however, the smaller dimensions of the individual plasma discharges in a plasma display screen cause the conversion of the electrical excitation energy into visible light to be much less efficient than in fluorescent tubes.

UV-phosphors are used as the phosphors in plasma display screens which, on UV-excitation, exhibit a very high efficiency. However, under the excitation conditions in fluorescent tubes and, in particular, under vacuum-UV-excitation conditions in plasma display devices a degradation, i.e. a decrease of the phosphor efficiency, occurs with excitation time.

OBJECTS AND SUMMARY OF THE INVENTION

It is an object of the invention to provide a plasma display device with a phosphor screen comprising a phosphor composition of an UV-phosphor with a coating which is not subject to degeneration when the phosphor is excited by UV-radiation.

In accordance with the invention, this object is achieved by a plasma display device with a phosphor screen comprising a phosphor composition of an UV-phosphor with a coating, which coating includes one or more catena-polyphosphates of one or more alkaline earth metals, zinc, cadmium and/or manganese.

Surprisingly, it has been found that a coating comprising one or more catena-polyphosphates of one or more alkaline earth metals, zinc, cadmium and/or manganese, acts as a stabilizing protective coating which causes the decrease in efficiency as a function of time of aluminate phosphors exposed to UV-excitation to be reduced and, in addition is transparent to UV-radiation. In addition, the coating in accordance with the invention inhibits the displacement of the color point exposed to UV-excitation. As a result, the advantages of the efficient UV-phosphors can be used for plasma display devices, and these plasma display devices remain bright and rich in contrast for a long period of time.

The anhydrous catena-polyphosphates of the type mentioned above form a hard, water-insoluble coating on the phosphor particles, they do not react with the UV-phosphors and, even when they are exposed to radiation, they do not degrade. As they are colorless, they do not influence the chromaticity of the phosphors. They are hydrophylic, so that the coated particles can be readily dispersed.

It is preferred, that the UV-phosphor is an aluminate phosphor.

It is also preferred that the above-mentioned catena-polyphosphate has a chain length of 3 to 90.

Within the scope of the invention it may be preferred that the coating comprises a catena-polyphosphate of an alkaline earth metal and 0.1 to 20% by weight of a catena-polyphosphate of a metal of the group formed by zinc, cadmium and manganese.

It is further preferred that the alkaline earth metal is at least a metal of the group formed by calcium, strontium and barium, and that the coating comprises 5% by weight of zinc-catena-polyphosphate and/or 5% by weight of manganese-catena-polyphosphate. A small quantity of cadmium, zinc or manganese in the coating has a positive effect on the deposition of the coating.

The phosphor composition may also comprise a covering layer of a dispersion aid. The inventive coating per se is abrasion-resistant, so that the coated phosphor can be transported and used. However, phosphor powders are customarily provided with a covering layer of a dispersion aid, which makes the phosphor powder easier to handle. As it has been found that dispersing agents, particularly those comprising surface-bound hydroxyl groups, such as $SiO_2$, even enhance ageing of the phosphors, it is particularly advantageous to protect an aluminate phosphor comprising a covering layer of a dispersion aid such as $SiO_2$ by a stabilizing intermediate layer of one or more catena-polyphosphates of the type mentioned hereinabove.

For the same reason, the combination of an UV-phosphor and a stabilizing coating of one or more of the above-mentioned catena-polyphosphates with a covering layer containing pigments, in particular pigments with surface-bound hydroxyl groups, is very advantageous. Preferably, the UV-phosphor is composed of $Ba(Al,Mg)_{11}O_{19}:Eu^{2+}$.

The invention further relates to a phosphor composition of an UV-phosphor with a coating including one or more catena-polyphosphates of metals of the group formed by alkaline earth metals, zinc, cadmium and manganese. These and other aspects of the invention will be apparent from and elucidated with reference to the embodiments described hereinafter.

DESCRIPTION OF THE PREFERRED EMBODIMENTS

Figure 1:
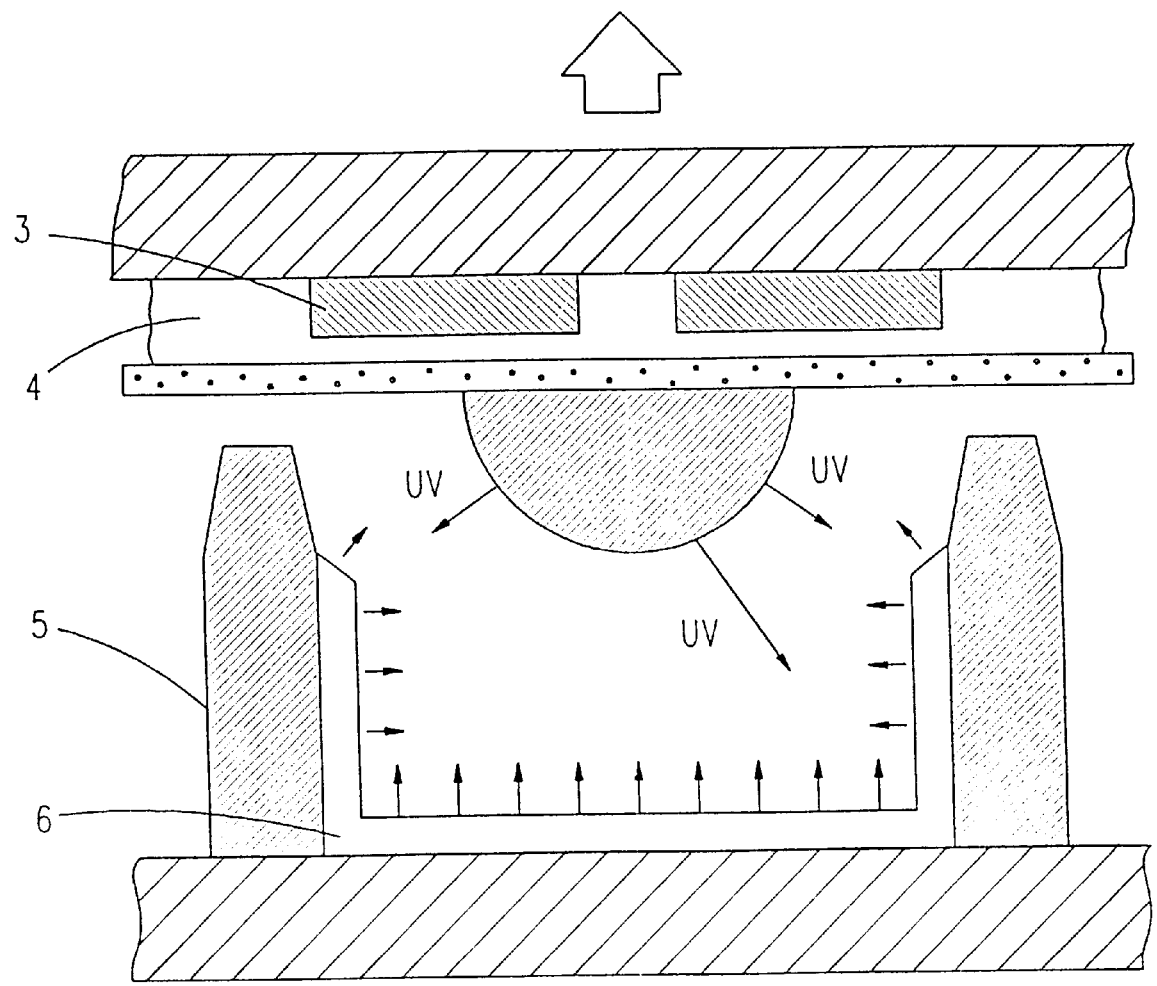
FIG. 1 shows a schematical view of a plasma display device.
Figure 2:
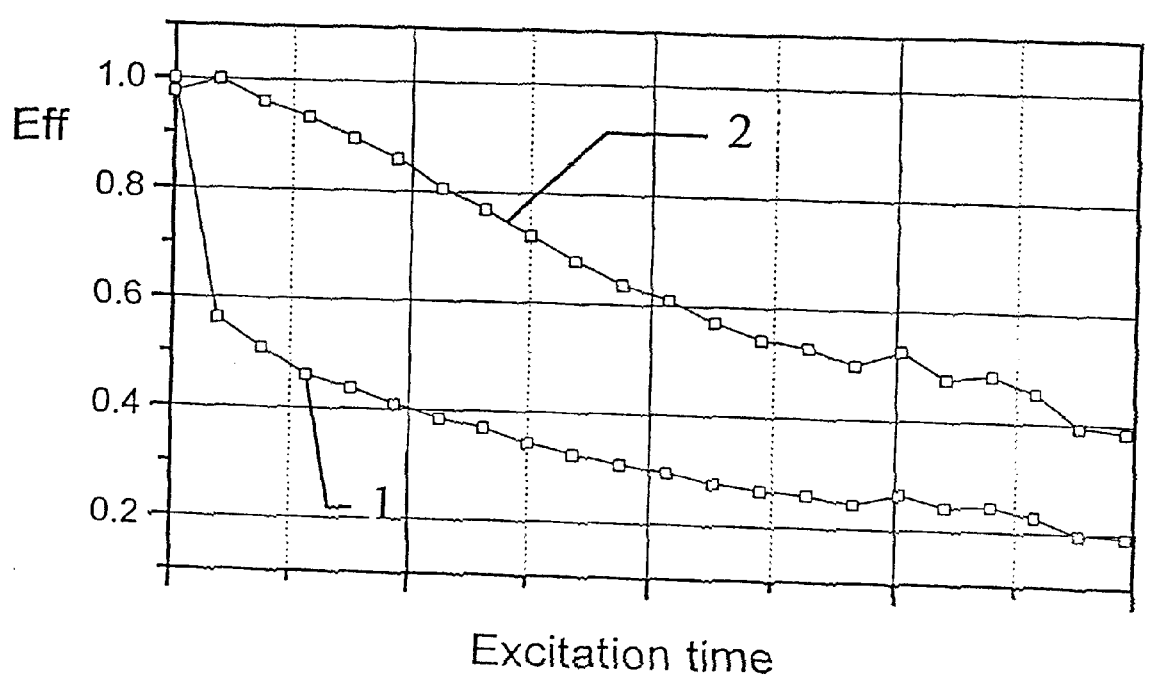
FIG. 2 shows the reduced decrease in efficiency of an inventively coated aluminate-phosphor 2 in comparison with the degradation of this phosphor without a coating 1.

The aluminate phosphors, which in accordance with the invention are furnished with a stabilizing coating, are primarily phosphors on the basis of $MeMgAl_{10}O_{17}$, where Me=Ba, Sr, Eu with the β-alumina crystal structure, for example $BaAl_{10}O_{17}:Eu$ (BAM), $Ba(MgAl)_{10}O_{17}:Mn$ and $BaAl_{12}O_{19}:Mn$, as well as phosphors having a related crystal structure, such as $BaMgAl_{16}O_{27}:Eu$ and $BaMgAl_{14}O_{23}:Eu$. In accordance with the invention, it is also possible to use aluminate phosphors having the magneto plumbite structure $MeAl_{12}O_{19}$, where Me=Ca, Sr, Eu, or $Ba(Mg,Al)_{11}O_{19}:Eu$. These aluminate phosphors are very efficient phosphors when they are exposed to UV-excitation or vacuum-UV-excitation. Further UV-Phosphors which can be used according to the invention are borates, such as $MeB_2O_4$, $MeLnBO_4$ $MeLnB_3O_7$, $LnBO_3$, $LnBO_3$, $LnMeB_2O_6$, $LnMe_3B_4O_{12}$, oxides, such as $MeO$, $Ln_2O_3$, $MeLnO_2$, phosphates such as $Me_3(PO_4)_2$, $Me_2P_2O_7$, $LNpo_4$, halophosphates such as $Me_5(PO_4)_3(F,Cl)$, sulfate such as $MeSO_4$, wolframates such as $MeWO_4$, $Me_3WO_6$, $Ln_2W_3O_{12}$, tantalates such as $LnTaO_4$, $Me_2LnTaO_6$, vanadate such as $LnVO_4$, $Me_5(VO_4)_2Cl$, molybdates such as $MeMoO_4$, niobates such as $LnNbO_4$, titanates such as $Me_2TiO_4$, $MeTiO_3$, germanates such as $MeGeO_3$, $Me_2GeO_4$, $Me_8Ge_2O_{11}F_2$, and halides such as $MeF_2$, $MeCl_2SiO_2$, $MeBr_2/SiO_2$, $MeJ_2/SiP_2$, $LnOF$, $LnOCl$, $LnOBr$; wherein Me=Ca, Sr, Ba and Ln=In, Sc, Y, La, Ce, Pr, Nd, Sm, Eu, Gd, Tb, Dy, Ho, Er, Th, Yb, Lu.

The phosphors may take the form of primary particles or of granulates comprising a mixture of latex and pigments. The grain size of the phosphor particles is not critical. The primary-grain size of commercially available phosphors ranges approximately from 2 to 20 $\mu$.

The phosphor particles are covered with a thin, uniform layer of one or more catena-polyphosphates of metals of the group formed by alkaline earth metals, for example magnesium, calcium, strontium, barium, zinc, cadmium, and manganese. The layer thickness customarily ranges from 0.001 to 0.2 $\mu m$ and, hence, is so thin that electron-penetration can take place without a substantial loss of energy.

The coating may additionally comprise organic or inorganic binders, such as latex, methyl cellulose or aluminium phosphate and $SiO_2$, to further improve the tightness of the coating and reduce the possibility of chemical attacks on the substrate.

As the starting compounds for the coating use is made of soluble alkali polyphosphates, ammonium polyphosphates or alkylammonium polyphosphates as well as water-soluble magnesium salts, calcium salts, strontium salts and/or barium salts, and as the starting compounds for the further catena-polyphosphates use is also made of the water-soluble salts of the bivalent cations of cadmium, manganese and zinc.

Sodium polyphosphate and ammonium polyphosphate are available in large quantities because they are also used as fertilizers. The other soluble alkali polyphosphates and the alkylammonium polyphosphates can be manufactured from these commercially available polyphosphates by ion-exchange or by a reaction of polyphosphoric acids with the corresponding hydroxides or amines.

Polyphosphates of the type employed here are unbranched, chain-like phosphates comprising the double-bonded $PO_4$ tetrahedron as the base unit of the chain. Their systematic name is "catena-polyphosphates". In a condensation reaction, sodium polyphosphates are recovered, on a large scale, from the acid, primary salts of the orthophosphoric acids. In this condensation reaction, dehydration takes place, and the water-vapor pressure over the melt, the temperature and duration of the heating operation, and the cooling rate determine the chain length and the crystallinity of the resultant polyphosphate. The mixtures obtained always have different chain lengths. Dependent upon the reaction conditions, products having the unsystematic names "Graham's salt", "Madrell's salt" $(NaPO_3)_x$ or "Kurrol's salt" $(KPO_3)_x$ are obtained. Unlike the practically insoluble "Madrell's salt" and the poorly soluble "Kurrol's salt", "Graham's salt" is readily soluble in water and, within the scope of the invention, the use of this salt is preferred. The chain length depends, in a very sensitive manner, on the precise manufacturing conditions, i.e. it may differ from manufacturer to manufacturer, or sometimes even from batch to batch. In addition, the analytical determination of the chain lengths is rather expensive. As a result, data regarding the average chain length in the "Graham's salt", which is preferably used here, vary, depending on the origin, between "12–18" and "up to 400". The chemical properties of polyphosphates having a sufficiently long chain differ only little from each other and hence are all equally suitable for the invention. An upper limit for the chain length is set by the water-solubility. The water-solubility decreases as the chain length increases and is also governed by the type of cation. Other water-soluble polyphosphates, which are manufactured in a similar manner as "Graham's salt" and which are referred to as "phosphate glass" or "water-soluble hexamethaphosphate" can also be used. Within the scope of the invention, long-chain, water-soluble polyphosphates having an average chain length of 80–90 are still suitable. In the case of short-chain catena-polyphosphates, the properties of the polyphosphates change so as to exhibit greater similarity with orthophosphates, because the influence of the terminal phosphate groups on the chemical properties increases. Short-chain catena-polyphosphates having a chain length <3 are unsuitable for the present invention.

For the water-soluble magnesium salts, calcium salts, strontium salts, barium salts, cadmium salts, manganese salts or zinc salts, use can be made, in particular, of their nitrates, acetates or perchlorates. For the water-soluble zinc salts and cadmium salts use can suitably be made of their halogenides, particularly chlorides, and their sulphates, nitrates or acetates. These zinc and cadmium compounds are separately or jointly dissolved in water. The concentration of the zinc or cadmium salts in the solution may range from 0.01 to 1 mol/l.

To prepare the coating solution, one or more water-soluble catena-polyphosphates are dissolved in water either separately or jointly. The concentration of polyphosphate in the aqueous solution may range, dependent upon the chain length and cation, from 0.5 to 10% by weight.

Customarily, water is used as the solvent. A content of 20 to 90% by weight of an organic solvent such as ethanol, methanol, acetone etc. requires special safety measures, but also leads to an improved deposition of the polyphosphate. In such aqueous-organic solvent mixtures, catena-polyphosphates comprising organic quaternary ammonium ions such as tetramethyl ammonium polyphosphate and tetrabutyl ammonium polyphosphate can still be readily dissolved. Alternatively, the solubility of sodium polyphosphates in such solvent mixtures can be increased by the addition of quaternary ammonium salts such as tetramethyl ammonium nitrate.

The phosphor to be coated is dispersed in this solution for 10 to 30 minutes.

Further, a solution of a water-soluble magnesium salt, calcium salt, strontium salt, barium salt, cadmium salt, manganese salt and/or zinc salt in water is prepared in a concentration of 1 to 15% by weight.

This solution is added to the phosphor suspension while continuously checking the pH-value. Said pH-value must remain within the neutral to alkaline range, preferably between 9.5 and 11.5, which, if necessary, may be achieved by adding a sodium hydroxide solution or ammonia. Subsequently, the suspension is stirred for 1–5 hours so as to irreversibly age the colloidal coating. Next, the coated phosphor is separated from the excess coating solution, washed with a washing liquid, such as alcohol/water, and dried at 100–150° C. By virtue of this method, a mechanically and chemically highly resistant coating is obtained which adheres well to the substrate.

The coating manufactured as described above customarily has a thickness in the range from 5 to 100 nm. By means of ESCA measurements it can be determined whether the coating fully covers the phosphor substrate, although, within the scope of the invention, it is not essential that the coating encloses the substrate particles in an absolutely tight manner.

The coating is hydrophilic and compatible with the customary coatings, so that it can be used as a substrate for further coatings which can be subsequently applied to improve the powder properties or the chromaticity of the material.

The coating itself is not subject to degradation. It can be demonstrated by means of ALT tests that, all in all, the service life of the material is increased by a factor of 5–10 by the coating.

It is particularly advantageous if the coating additionally comprises $SiO_2$. This $SiO_2$ coating can form part of the mixture which also includes the catena-polyphosphate coating or can be provided separately as a covering layer on this coating. Said $SiO_2$-containing coating enables the viscosity of the powder to be increased.

Dependent upon the method used to manufacture the luminescent screens, the coated phosphor compositions are used in a "dry state", i.e. as dry power or "in a wet state", i.e. suspended in a photoresist. If the phosphor compositions are used in a "wet process", then after the coating operation, the phosphor powder does not have to be isolated as a dried powder, yet is directly subjected to further processing in solution. Instead of separating the phosphor from the excess coating solution, followed by washing with a washing liquid and, subsequently, drying, a photoresist is added to the phosphor suspended in the coating solution, the phosphor/resist-suspension is applied as a film onto a substrate, dried, and exposed through a shadow mask, whereafter the non-exposed parts are removed by washing.

EXAMPLE

In a typical example, a quantity of 100 g $BaAl_{10}O_{17}:Eu^{2+}$ (BAM) are dispersed in 100 ml of distilled water. The dispersion is subjected to an ultrasound treatment for 3 minutes and then stirred for 10 minutes while being exposed to ultrasound. A solution of 2.04 g sodium-polyphosphate in 100 ml of distilled water is added and the suspension is subjected to an ultrasound treatment for 2 minutes. A solution of 20 ml of 1-molar ammonia solution and 3.54 g $Ca(NO_3)_2 \cdot 4H_2O$ in 90 ml of distilled water are added dropwise to the phosphor suspension subjected to an ultrasound treatment and stirred for 2 minutes. The pH-value of the solution is approximately 9.7. The phosphor thus coated is separated from the suspension by vacuum filtration and washed twice with 1 l of a water-acetone mixture (50:50) and filtered in a vacuum, whereafter it is washed with acetone and dried at 100° C. for one hour. Subsequently, the coated phosphor is heated to 320° C. at a rate of 2.5° C./min and maintained at 320° C. for one hour, after which it is cooled.

We claim:

1. A plasma display device with a phosphor screen comprising a phosphor composition of a UV aluminate phosphor provided with a coating comprising one or more catena-polyphosphates of metals selected from the group consisting of alkaline earth metals, zinc, cadmium and manganese.

2. A plasma display device with a phosphor screen as claimed in claim 1, characterized in that catena-polyphosphates have a chain length of 3 to 90.

3. A plasma display device with a phosphor screen as claimed in claim 1, characterized in that the coating comprises a catena-polyphosphate of an alkaline earth metal and 0.1 to 20% by weight of the coating of a catena-polyphosphate of a metal selected from the group consisting of zinc, cadmium, and manganese.

4. A plasma display device with a phosphor screen as claimed in claim 3, characterized in that the alkaline earth metal is at least a metal selected from the group consisting of calcium, strontium and barium, and the coating comprises 5% by weight of the coating of zinc-catena-polyphosphate and/or 5% by weight of manganese-catena-polyphosphate.

5. A plasma display device with a phosphor screen as claimed in claim 1, characterized in that the phosphor composition comprises a covering layer of a dispersion aid on said coating.

6. A plasma display device with a phosphor screen as claimed in claim 1, characterized in that the phosphor composition comprises a covering layer with a pigment on said coating.

7. A plasma display device with a phosphor screen as claimed in claim 1, characterized in that the UV-phosphor is composed of $Ba(Al,Mg)_{11}O_{19}:Eu^{2+}$.

8. A phosphor composition of UV aluminate-phosphor provided with a coating comprising one or more catena-polyphosphates of metals selected from the group consisting of alkaline earth metals, zinc, cadmium and manganese.

* * * * *